(12) United States Patent
Price et al.

(10) Patent No.: US 9,003,280 B2
(45) Date of Patent: Apr. 7, 2015

(54) DISPLAYING STILL AND MOVING IMAGES OF A CONSTANT SIZE OR IMAGES THAT OCCUPY A SPECIFIED PERCENTAGE OF A SCREEN ACROSS DIFFERENT SIZE DISPLAY SCREENS

(75) Inventors: William Pat Price, Rhome, TX (US); Timothy Elliott, Huntington Beach, CA (US); Marcus Apitz, Yorba Linda, CA (US)

(73) Assignee: Vizio, Inc., Irvine, CA (US)

( * ) Notice: Subject to any disclaimer, the term of this patent is extended or adjusted under 35 U.S.C. 154(b) by 1256 days.

(21) Appl. No.: 12/118,523

(22) Filed: May 9, 2008

(65) Prior Publication Data

US 2009/0278861 A1 Nov. 12, 2009

(51) Int. Cl.
G06F 3/00 (2006.01)
G06Q 30/02 (2012.01)
G09G 5/00 (2006.01)
H04N 7/01 (2006.01)

(52) U.S. Cl.
CPC ............ *G06Q 30/02* (2013.01); *G06Q 30/0273* (2013.01); *G06Q 30/0283* (2013.01); *G09G 5/005* (2013.01); *H04N 7/0122* (2013.01); *G09G 2340/0407* (2013.01); *G09G 2340/0442* (2013.01); *G09G 2360/02* (2013.01); *G09G 2370/027* (2013.01)

(58) Field of Classification Search
CPC .............. G06Q 30/02; G06Q 30/0273; G06Q 30/0283; G06Q 30/0251; G09G 2340/0407; G09G 2340/0442; G09G 2360/02; G09G 5/005; G09G 2320/103; H04N 7/0122; H04N 5/91; H04N 1/00161; H04N 13/00; H04N 13/0048; H04N 21/2343; H04N 21/42204; H04N 21/4312; H04N 21/435; H04N 21/4782; H04N 21/482; H04N 21/4854; H04N 21/6125; H04N 21/816; H04N 21/8543; H04N 2201/04787; H04N 1/3935; H04N 2201/04793; G06F 17/30867; G06F 17/2247; G06F 9/4443; G06F 3/048; G06F 3/04845; G06F 8/34; G06F 8/38; G06F 17/30905; G06F 17/30861; G06F 17/30899; G06F 3/0483; G06F 17/218; G06F 17/24; G06F 17/272; G06F 17/3089; G06F 17/211; G06F 17/30259; G06F 17/30643; G06F 17/212; G06F 3/14
USPC ......... 715/200, 234, 243, 254, 255, 800, 801, 715/807
See application file for complete search history.

(56) References Cited

U.S. PATENT DOCUMENTS 7,590,947 B1 * 9/2009 Gay et al. ...................... 715/800
2004/0216056 A1 * 10/2004 Tootill ........................... 715/786
(Continued)

OTHER PUBLICATIONS

Bowers, Michael, "Pro CSS and HTML Design Patterns," 2007, pp. 24 and 98-105.*

*Primary Examiner* — Kyle Stork
(74) *Attorney, Agent, or Firm* — Law Office of Scott C. Harris, Inc.

(57) ABSTRACT

Advertisers specify the size of an ad in pixels or in physical units such as inches or millimeters. The physical square area of an ad specified in pixels will change as the physical size of the television screen or computer display screen varies. The number of pixels of an ad specified in inches or millimeters will also change as the physical size of the television screen or computer display screen varies. The present invention manages the issue of keeping the physical area size of an image constant across television display screens regardless of the physical size of the screen.

15 Claims, 4 Drawing Sheets

10

| Television Screen and Pixel Dimensions | | | | | |
|---|---|---|---|---|---|
| Diag | Vert | Vert Pixel | Horz | Horz Pixel | Screen Area |
| 26 | 12.75 | 0.011806 | 22.70 | 0.011823 | 289.43 |
| 32 | 15.70 | 0.014537 | 27.90 | 0.014531 | 438.03 |
| 37 | 18.10 | 0.016759 | 32.25 | 0.016797 | 583.73 |
| 42 | 20.60 | 0.019074 | 26.60 | 0.013854 | 547.96 |
| 47 | 23.00 | 0.021296 | 41.00 | 0.021354 | 943.00 |
| 50 | 24.50 | 0.022685 | 43.60 | 0.022708 | 1,068.20 |
| 52 | 25.50 | 0.023611 | 45.32 | 0.023604 | 1,155.66 |

(56) References Cited

U.S. PATENT DOCUMENTS

| | | | |
|---|---|---|---|
| 2005/0223335 A1* | 10/2005 | Ichikawa | 715/801 |
| 2007/0076020 A1* | 4/2007 | Fleming et al. | 345/698 |
| 2007/0078814 A1* | 4/2007 | Flowers et al. | 707/2 |
| 2010/0023746 A1* | 1/2010 | Imamoto | 713/150 |

* cited by examiner

10

| Television Screen and Pixel Dimensions ||||||
|------|-------|------------|-------|------------|----------------|
| Diag | Vert  | Vert Pixel | Horz  | Horz Pixel | Screen Area    |
| 26   | 12.75 | 0.011806   | 22.70 | 0.011823   | 289.43         |
| 32   | 15.70 | 0.014537   | 27.90 | 0.014531   | 438.03         |
| 37   | 18.10 | 0.016759   | 32.25 | 0.016797   | 583.73         |
| 42   | 20.60 | 0.019074   | 26.60 | 0.013854   | 547.96         |
| 47   | 23.00 | 0.021296   | 41.00 | 0.021354   | 943.00         |
| 50   | 24.50 | 0.022685   | 43.60 | 0.022708   | 1,068.20       |
| 52   | 25.50 | 0.023611   | 45.32 | 0.023604   | 1,155.66       |

| 100 X 100 Pixel Area: Percentage of Screen Area = .48% ||||| 
|------|----------------|----------------|---------|-------------------|
| Diag | 100 Pixel Vert | 100 Pixel Horz | Sq Area | Total Area Screen |
| 26   | 1.1806         | 1.1823         | 1.40    | 289.43            |
| 32   | 1.4537         | 1.4531         | 2.11    | 438.03            |
| 37   | 1.6759         | 1.6797         | 2.82    | 583.73            |
| 42   | 1.9074         | 1.3854         | 2.64    | 547.96            |
| 47   | 2.1296         | 2.1354         | 4.55    | 943.00            |
| 50   | 2.2685         | 2.2708         | 5.15    | 1,068.20          |
| 52   | 2.3611         | 2.3604         | 5.57    | 1,155.66          |

| 200 X 200 Pixel Area: Percentage of Screen Area = 1.93% |||||
|------|----------------|----------------|---------|-------------------|
| Diag | 200 Pixel Vert | 200 Pixel Horz | Sq Area | Total Area Screen |
| 26   | 2.3611         | 2.3646         | 5.58    | 289.43            |
| 32   | 2.9074         | 2.9063         | 8.45    | 438.03            |
| 37   | 3.3519         | 3.3594         | 11.26   | 583.73            |
| 42   | 3.8148         | 2.7708         | 10.57   | 547.96            |
| 47   | 4.2593         | 4.2708         | 18.19   | 943.00            |
| 50   | 4.5370         | 4.5417         | 20.61   | 1,068.20          |
| 52   | 4.7222         | 4.7208         | 22.29   | 1,155.66          |

FIG. 3

| 300 X 500 Pixel Area: Percentage of Screen Area = 7.23% ||||
|---|---|---|---|---|
| Diag | 300 Pixel Vert | 500 Pixel Horz | Sq Area | Total Area Screen |
| 26 | 3.5417 | 5.9115 | 20.94 | 289.43 |
| 32 | 4.3611 | 7.2656 | 31.69 | 438.03 |
| 37 | 5.0278 | 8.3984 | 42.23 | 583.73 |
| 42 | 5.7222 | 6.9271 | 39.64 | 547.96 |
| 47 | 6.3889 | 10.6771 | 68.21 | 943.00 |
| 50 | 6.8056 | 11.3542 | 77.27 | 1,068.20 |
| 52 | 7.0833 | 11.8021 | 83.60 | 1,155.66 |

DISPLAYING STILL AND MOVING IMAGES OF A CONSTANT SIZE OR IMAGES THAT OCCUPY A SPECIFIED PERCENTAGE OF A SCREEN ACROSS DIFFERENT SIZE DISPLAY SCREENS

BACKGROUND

Very little prior art exists related specifically to television advertising. Application 20050015800—Holcomb,—Jan. 20, 2005 Method and system for managing television advertising, involves pricing based on what are referred to as cells which include a channel, a day, and a service zone. Cells with varying parameters have different relevant values. Holcomb describes ads being priced based on the channel, day of the week, and the geographical area in which the ad will be shown.

Internet analogs to pricing of ads based on area are generally selling constant pixel sized ad windows. Two examples of this type of pricing are found at:

http://www.milliondollarhomepagesites.com/ad_cost.htm
and http://simplythebest.net/pixels/explained.html Milliondollarhomepagesites.com sell rectangular areas of 100 by 30 pixels. Each block contains a hot link to the advertiser's home page. Advertisers can buy one or a multiple of blocks for varying amounts of time for varying amounts of money. The block generally contains a logo with the hot link under the logo.

Simpleythebest.net displays a matrix of 100 small blocks horizontal and vertical. Each block can contain a hot link. When the cursor hovers over the block, a larger "ad" pops onto the screen. If the small hot link block is clicked, the home web page for the referenced site is displayed. Simpleythebest.net prices ads based on the number of days a hot link is valid.

SUMMARY OF THE INVENTION

While the prior art has examples of selling a constant size block based on pixels, the inventors recognize that this prior art can not guarantee that the blocks are not going to change in physical size depending on the physical dimension of the screen. In fact, the inventors found that simpleythebest.net becomes almost unusable on very small laptops with sub 10 inch screens.

The disclosure herein addresses this issue by describing technology that automatically scales static images and video images based on metadata attributes specifying that the image is to be scaled to a constant physical size regardless of the physical size of the target screen; and/or metadata attributes specifying that the image should be scaled to occupy a specified percentage of the area of the target screen.

Ads can be priced based on a guaranteed display screen physical area that will be the same across any size display screen.

Embodiments provide for creation of tiered pricing for display of ads on digital television screens. The current methodology of displaying a constant size image based on pixels or scan lines can be overcome. This methodology results in the size of the physical image varying when viewed at a constant distance based on the physical size of the screen. For example, if there are 2 televisions sitting 10 feet from the viewer and one screen is 26 inches and the other is 52 inches, the same image on both screens will appear to be 2 different physical sizes. If the image is a constant 300 pixels high and 500 pixels wide, the image will appear to be 5.9 inches wide and 3.5 inches high on the 26 inch screen and 11.8 inches wide and 7 inches high on the 52 inch screen. As a function of area, the image on the 26 inch screen will occupy 20.65 square inches and the image on the 52 inch screen will occupy 82.6 square inches or 4 times the area of the smaller screen. As a percentage of screen area both images occupy just over 7% of the total area of each screen.

The inventors recognize that an advertiser has an incentive to pay more for an ad, wither a display ad or a video ad in a window, if the ad appears to be larger to the viewer. However, it is typically impossible for the creator of an image to know the size of the screen on which the image will be displayed.

It is an object of the invention to alleviate the responsibility of creating different size images for different size screens by moving the intelligence for computing the physical image size from the creator of the image to a processing engine contained in the television platform. Modern digital televisions contain many computing engines such as microprocessors that are software driven and have the ability to scale images up or down.

It is a further object of the invention to allow for the inclusion of metadata containing a plurality of data specifying a number of parameters such as percentage of screen size for the image, which screens may or may not show the image, color changes to the foreground and background, font sizes for text, and any other of a plurality of parameters.

It is still another object of the invention to provide the same functionality to other applications such as video mail or video conferencing.

It is a further object to provide the same functionality to user or viewer created images such as still images displayed for applications such as television based picture frames and video content such as on-line video sites such as YouTube or Crackle.

It is still another object of the invention to provide a viewer with the ability to specify the physical size of window areas on the display used for basic television applications such as Picture-In-Picture.

BRIEF DESCRIPTION OF THE DRAWINGS

Embodiments are illustrated by way of example, and not by way of limitation. The following figures and the descriptions both brief and the detailed descriptions of the invention refer to similar elements and in which:

FIG. 1 is a matrix showing the size of 16:9 ratio screen dimensions for various size screens.

FIG. 2 is a matrix showing the physical area of a 100×100 pixel area on various size screens.

FIG. 3 is a matrix showing the physical area of a 200×200 pixel area on various size screens.

DETAILED DESCRIPTION

FIGS. 1 through 4 show a series of matrices showing information for different display screens. FIG. 1 includes chart 10 which shows the dimensions for display screens, where the ratio between the width of the screen and the height of the screen is 16:9. This is the ratio used for high definition television screens. Display screen size for such screens is measured on the diagonal of the screen, that is from a bottom corner to the opposite top corner.

FIG. 1 shows the physical dimensions for screens ranging from 26 inches to 52 inches. Note that doubling the diagonal length of the screen increases the square area of the screen by 4. High definition televisions present a video frame or picture as a series of pixels across horizontal lines. In high definition televisions, there are 1,920 pixels across each horizontal line and 1,080 horizontal lines in the vertical plane. The width of each pixel in the horizontal plane is computed by dividing the width of the screen by the number of pixels:

Pixel Width=Screen Width/Number Of Pixels

Thus for a 26 inch screen:

0.011823=22.7/1920 and the height is computed by:

Pixel Height=Screen Height/Number Of Pixels

Thus for a 26 inch screen:

0.011806=12.75/1080

FIG. 2 shows a table 20 which shows the area for a window displayed on various size 16:9 ratio television screens where the size of the window is held constant at 100 by 100 pixels. Note that for a 26 inch display screen, the area of such a 100 by 100 pixel windows is 1.4 sq inches. The area of the display screen itself is 289.43 square inches. The percentage of the area of the window compared to the display screen as a whole is 0.48%. Note that as the display screen size is increased from 26 inches to 52 inches the size of the 100 by 100 pixel window increases from 1.4 square inches to 5.57 square inches but the percentage of area of the window remains constant at 0.48%.

If a viewer were to have 7 television display screens positioned at a constant distance and each display screen was displaying the same 100 by 100 pixel window, the window appearing on the 52 inch display screen would better attract the eye than would the window displayed on the 26 inch display screen. To the viewer, any information displayed inside the physically-larger window will be easier to resolve.

Figures 4, 5:
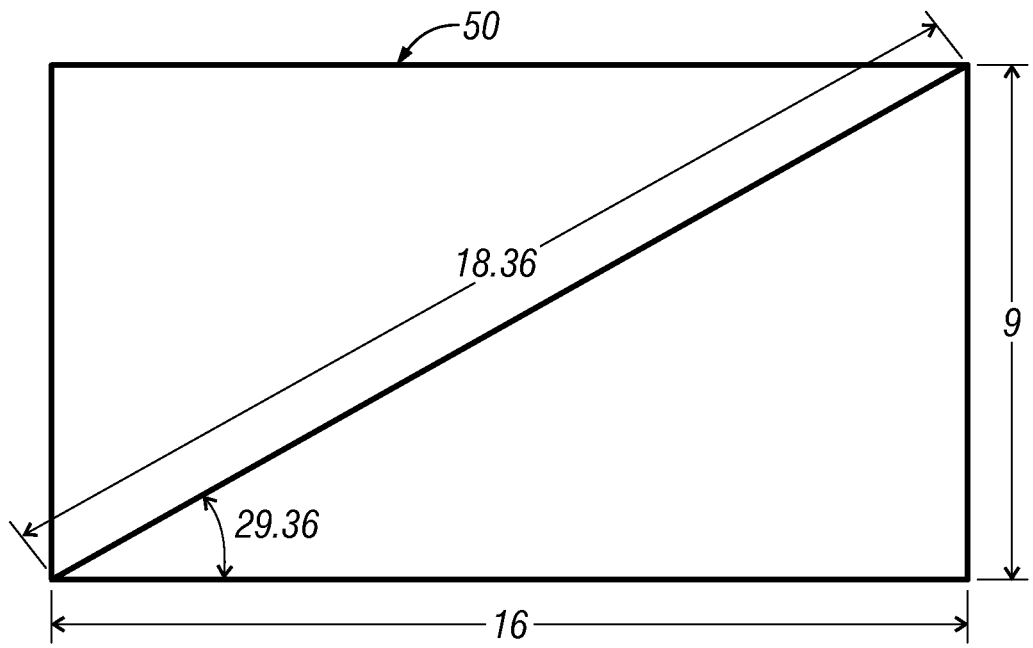
FIG. 4 is a matrix showing the physical area of a 300×500 pixel area on various size screens.
FIG. 5 shows the layout including diagonal angle and length and dimensions of a 16:9 ration screen with a size of 16 inches by 9 inches.

FIGS. 3 and 4 show tables 30 and 40 with the physical sizes of windows of 200 by 200 pixels and 300 by 500 pixels for screen sizes of 26 inches to 52 inches. As the size of the window is increased, the net effect of size becomes magnified to the viewer as will be shown in the following figures and descriptions.

FIG. 5 shows a visual representation 50 of the layout for a 16:9 ratio television screen whose diagonal distance is 18.36 inches and whose width and height are 9 inches by 16 inches.

Figure 6:
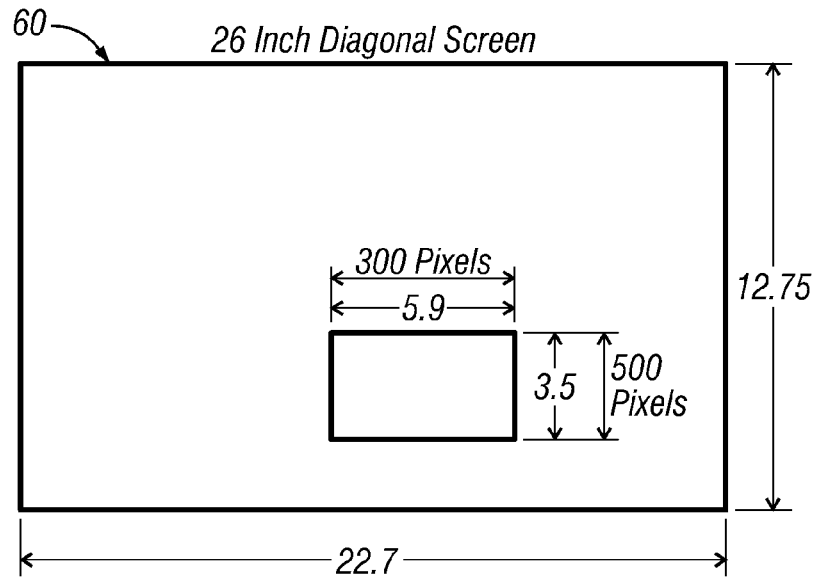
FIG. 6 shows the layout dimensions of a 26 inch screen and the amount of physical screen area occupied by a 300×500 pixel block.
Figure 7:
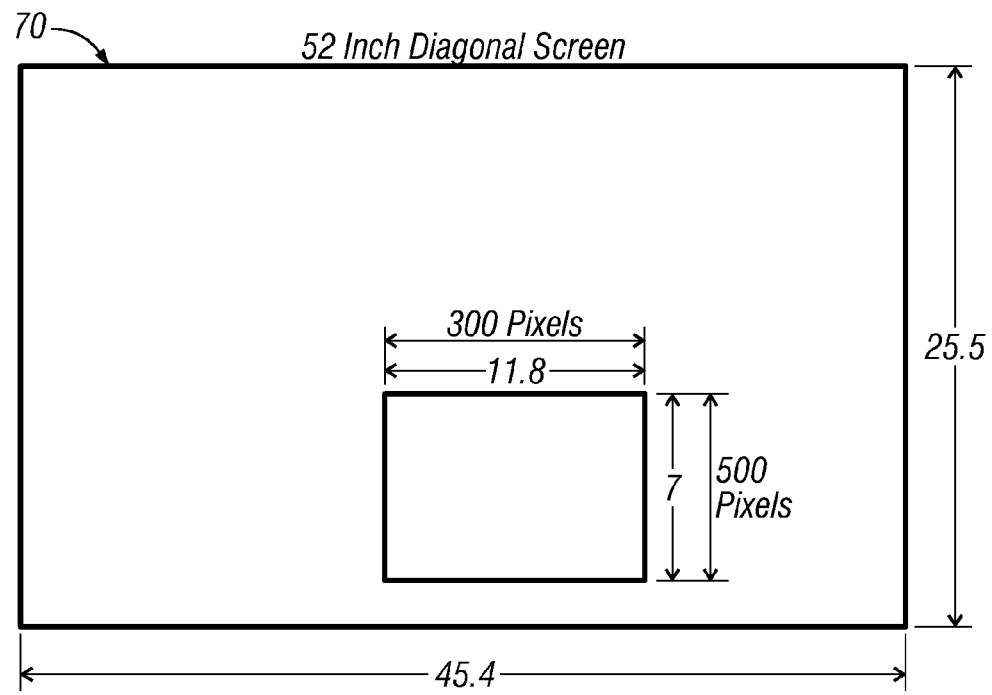
FIG. 7 shows the layout dimensions of a 52 inch screen and the amount of physical screen area occupied by a 300×500 pixel block.

FIGS. 6 and 7 show the relative visual differences between a 26 inch display screen and a 52 in display screen. Each of the display screens have the same 300 by 500 pixel window inlaid on top of the screen.

Figure 8:
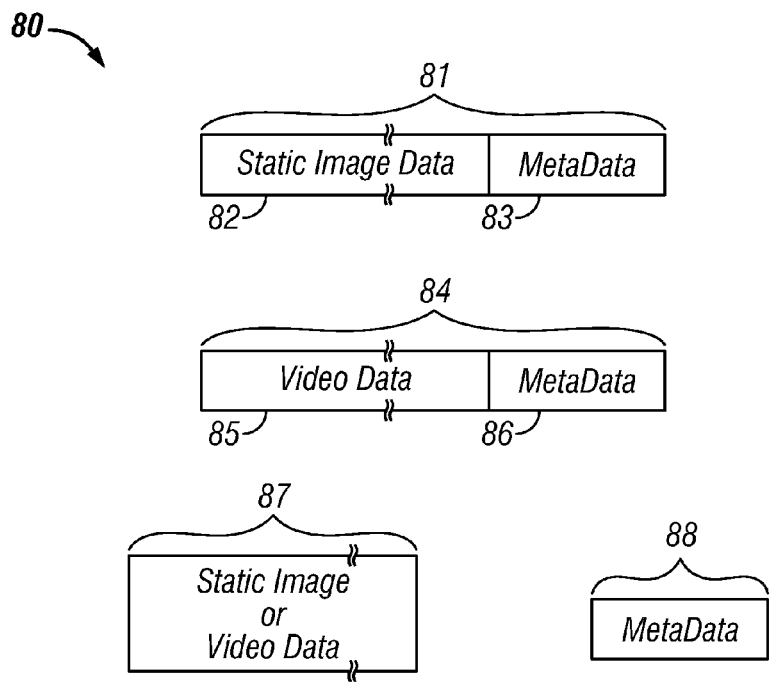
FIG. 8 shows 4 data items, a static image file format with embedded metadata, a video image file format with embedded metadata and a static image or video data file format with an associated metadata file.

FIG. 8 illustrates a plurality of typical files 80 as exploited by an embodiment. Static Image File 81 consists of Static Image Data 82 and Static Image Metadata 83. Static Image File 81 is of any of a plurality of static image file types such as jpeg, bmp, gif, tiff, png or animated image. Static Image Metadata 83 contains data that provides a plurality of display attributes. These attributes may include, for example, scaling information, positioning information, alpha blending information, display times, start and end of display transitions, and/or any other information important to the display and image manipulation. Scaling information may be an absolute size in pixels or inches or percentage of display screen area. Video Data File 84 consists of Video Data 85 and Metadata 86. The association between Video Data 85 and Metadata 86 is the same as that shown for Static Image File 81. Static Image or Video Data File 87 is associated with Metadata File 88. In this embodiment Metadata File 88 contains the metadata that provides a plurality of display attributes for Static Image or Video Data File 87. These attributes may include, for example, scaling information, positioning information, alpha blending information, display times, start and end of display transitions, and/or any other information important to the display and image manipulation. Scaling information may be an absolute size in pixels or inches or percentage of display screen area.

An absolute size attribute controls the image to appear as the same physical size regardless of the screen size. This controls the image to have the same physical size on a 26 inch display screen as it would be on a 52 inch screen. In this embodiment, an image that is 300 by 500 pixels on a 52 inch display screen will occupy an area that is 599 by 998 pixels wide on a 26 inch display screen.

Video Data File 84 is formed of Video Data 85 and Video Data Metadata 86. Video Data File 85 is any of a plurality of video data formats such as MPEG-2, Flash Video, or any other video file format. Video Data Metadata 86 contains data that provides a plurality of display attributes. These attributes may include scaling information, positioning information, alpha blending information, display times, start and end of display transitions, and/or any other information important to the display and image manipulation. Scaling information may be an absolute size in pixels or inches or percentage of display screen area. An absolute size attribute allows the video image to appear as the same physical size regardless of the screen size. This allows for the case where a video image playback window would be the same physical size on a 26 inch display screen as it would be on a 52 inch screen. In another embodiment, metadata is separately contained in a file as illustrated by Static Image or Video Data File 87 and associated Metadata File 88. This embodiment is intended to show that the metadata for a given image or video file may come from a plurality of sources such as a separate file, from a database of metadata accessible over a network.

Figure 9:
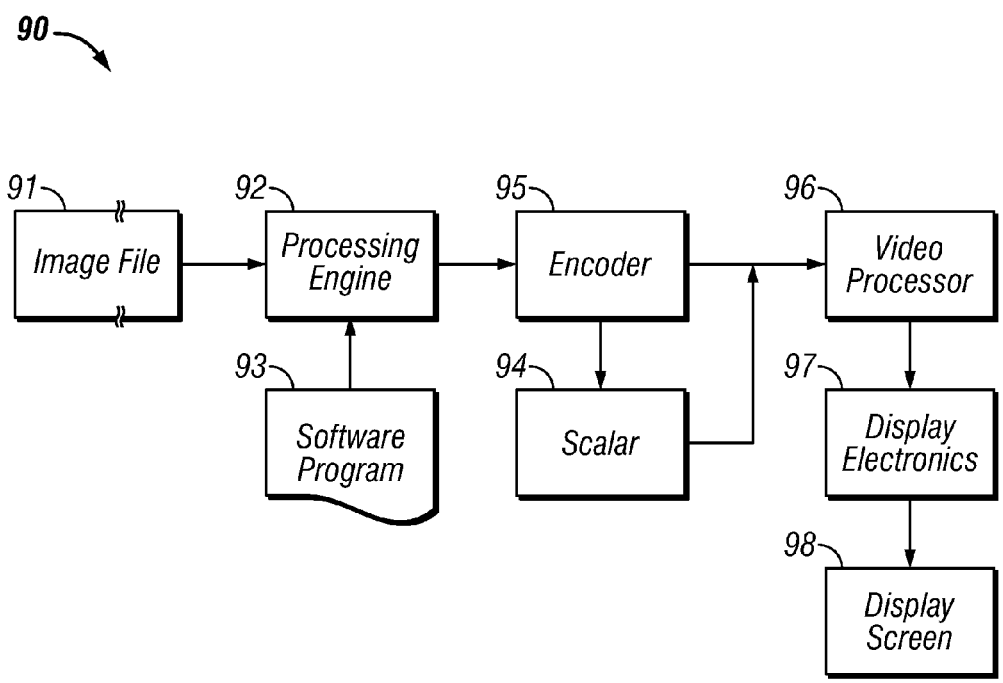
FIG. 9 shows a flow diagram where an image file containing image data and metadata is processed and sent to the display.

FIG. 9 shows a flow 90 of the embodiment as processed on a modern day digital television. For the purposes of clarity, the functional blocks shown in FIG. 9 may not each be a discrete device in an actual digital television. Evolving technology in the television field generally results in greater levels of integration than shown in FIG. 9. In an actual television, all or most of the functional blocks shown may be contained in a single chip or in two or more chips. For example, Decoder 95 may be either a block of software code executing on Processing Engine 92 or may be a block of software code executing on a microprocessor embedded inside a physical integrated circuit chip labeled as Decoder 95 or may be implemented completely in gates contained in an integrated circuit chip labeled as Decoder 95.

In FIG. 9, Scaler 94 and Decoder 95 may be implemented as gates contained in individual integrated circuit chips or as gates contained in a common integrated circuit chip or as blocks of software code executing on a microprocessor chip which may be the same microprocessor labeled as Processing Engine 92 or may be another microprocessor. In FIG. 9, this embodiment shows Image File 91 entering Processing Engine 92. Processing Engine 92 is a microprocessor that is controlled by Software Program 93. In one embodiment, Software Program 93 will cause Processor Engine 92 to direct Decoder 95 to scale the image(s) contained in Image File 91 to the constraints specified by metadata contained in Image File 91 after decoding the image(s). In this embodiment, Software Program 93 will direct Decoder 95 to pass the decoded and scaled image(s) to Video Processor 96. Video Processor 96 performs processing on the image such as alpha blending, isolation of the image to a particular size, and performs any other processing as specified by metadata contained in Image File 91 and as directed by Processing Engine 92. After processing, Video Processor 96 passes the video image to Display Electronics 97 which converts the output of Video Processor 96 to be displayed on Display Screen 98.

In another embodiment, Software Program 93 directs Processing Engine 92 to pass the images contained in Image File 91 to Decoder 95 for decoding then to Scaler 94 which scales the image(s) contained in Image File 91 to the constraints specified by metadata contained in Image File 91. Scaler 94 then sends the images which it has scaled to Video Processor 96. Video Processor 96 performs processing on the image such as alpha blending, isolation of the image to a particular size, and performs any other processing as specified by metadata contained in Image File 91 and as directed by Processing Engine 92. After processing, Video Processor 96 passes the video image to Display Electronics 97 which converts the output of Video Processor 96 to be displayed on Display Screen 98.

In an embodiment, Processing Engine 92 may be formed entirely of hardware logic that reacts to data patterns without the direction of software instructions. In this embodiment, scaling of images is controlled by the hardware.

It is an object of the invention to permit the scaling of static and video images based on a metadata attribute such that a single image can be the same physical size in inches when displayed on different size display screens. This allows for the creation of a tiered pricing structure for static image and video ads when displayed on different size screens.

This thus allowing a single image of any given size to appear identical to the viewer regardless of the size of the display screen.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other comparing structures can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of displaying information comprising:
    receiving, in a processing system, an image file which includes display data and display attributes associated with the display data, said display attributes including an absolute size attribute to control a display which is displayed based on said display data to be displayed as the same physical size as measured in units of measurement that are independent of a physical size of a display screen on which the image is displayed;
    calculating information, using a physical size of the display screen and said absolute size attribute, to use to display the image file on the display screen, and where said same physical size comprises a first percentage of a first display screen and a second percentage different than said first percentage of a second display screen of a different size than said first display screen; and
    producing an output to the display screen that causes said display data to be displayed on the display screen as the same physical size on any display screen of any of a plurality of different numbers of sizes.

2. A method as in claim 1, wherein said image file includes a source image file with metadata included, and where said calculating calculates height and width of said pixels of the screen and creates the output based on said calculate.

3. A method as in claim 2, wherein said metadata attribute includes information directing that the current image be scaled to the specified physical size in height and width.

4. A method as in claim 3, further comprising computing a target size of the image in pixels as specified by said metadata for physical target height and width and scaling the received image to the new size based on a number of pixels needed for the height and width for a present display screen.

5. A method as in claim 4, further comprising displaying a received image on the present display screen.

6. A method of claim 1, where said image file includes static images includes an image format from the group of image formats consisting of GIF, TIFF, BMP or JPG.

7. A method of claim 1 where said image file includes video images in a video format.

8. A method as in claim 1, further comprising billing for an advertisement based on said physical size of a display ad represented by said image on any physical size display screen.

9. The method as in claim 1, wherein said physical units of measurement are inches.

10. The processing system as in claim 1, wherein the image file is a static image.

11. A method of displaying information comprising:
    providing an absolute size attribute which controls an image to appear as the same physical size as measured in units of measurement that are independent of a physical size of a display screen on which the image is displayed;
    calculating information using a physical size of the display screen and said absolute size attribute, to use to display the image file on the display screen; and using said information to display said image on an output display and to appear as the same physical size on any display screen of any of a plurality of different numbers of sizes.

12. The method as in claim 11, wherein said physical units of measurement are inches.

13. A system for displaying information, comprising:
a processing system, receiving an image file which includes display data and display attributes associated with the display data, said display attributes including an absolute size attribute, said processing system calculating information, using a physical size of the display screen and said absolute size attribute, to use to display the image file on the display screen, and using said information for creating an output display data value which controls a display to show said display data as the same physical size as measured in units of measurement that are independent of a physical size of a display screen on which the image is displayed and where said same physical size comprises a first percentage of a first display screen and a second percentage different than said first percentage of a second display screen of a different size than said first display screen; and
producing said output to a display screen, that causes said display data to be displayed on the display screen as the same physical size on any display screen of any of a plurality of different numbers of sizes.

14. The system as in claim 13, wherein said output causes the display data to be displayed as a value of an inches, where and is a constant, on both the first display screen of the first size and a second display screen of a second size.

15. The processing system as in claim 13, wherein the image file is a video.

* * * * *